March 31, 1936.    G. F. WIKLE    2,035,682
APPARATUS FOR SPLICING STRIP MATERIAL
Filed Aug. 31, 1933    3 Sheets-Sheet 1

INVENTOR.
GEORGE F. WIKLE
BY
ATTORNEYS.

INVENTOR.
GEORGE F. WIKLE
BY
ATTORNEYS.

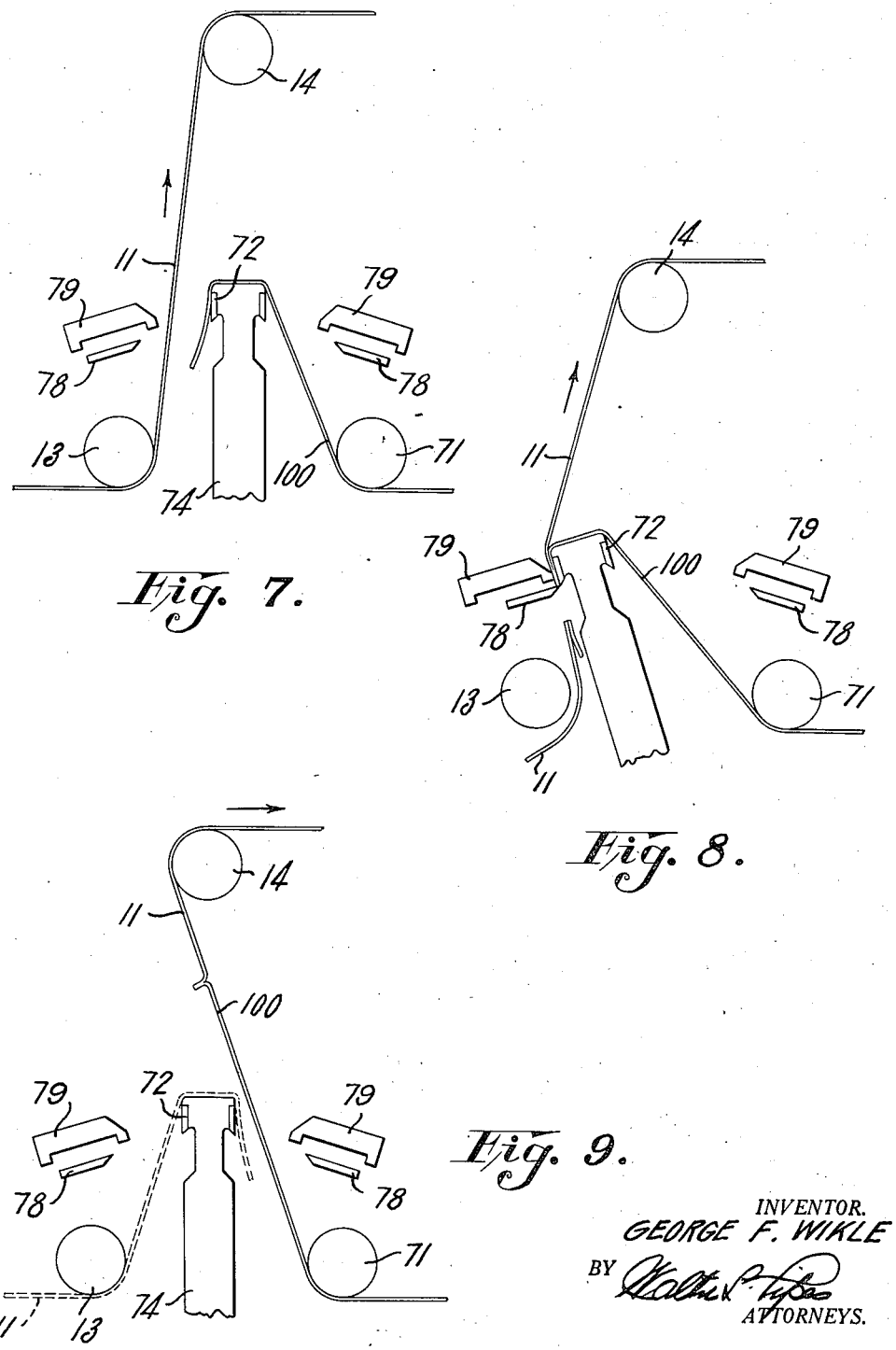

Patented Mar. 31, 1936

2,035,682

UNITED STATES PATENT OFFICE 2,035,682

APPARATUS FOR SPLICING STRIP MATERIAL

George F. Wikle, Detroit, Mich., assignor, by mesne assignments, to United States Rubber Company, New York, N. Y., a corporation of New Jersey Application August 31, 1933, Serial No. 687,634

12 Claims. (Cl. 154—42)

In particular, my invention relates to apparatus for splicing together separate pieces of rubber stock so as to form one continuous moving strip of stock.

In the manufacture of tires various stocks, commonly known as gum stock, recoat, or bologna, are usually composed of thin, unvulcanized rubber and as such are difficult to handle because they have adhesive qualities and are easily stretchable. These characteristics make the stock unsuitable for handling in festoon devices or other take-up mechanisms.

By my invention, I provide a mechanism in which the stock may be withdrawn from rolls where it is separated by interposed liner fabric and then spliced so as to form a continuous length of stock, without any interruption in the movement of the stock to an associated machine and without the use of any festoon or other take-up mechanism. The apparatus may be utilized in combination with and/or driven from other tire building machines to which a continuous flow of stock is desired.

Other objects and advantages will become apparent in the following detailed description, when considered in connection with the accompanying drawings, in which:

Figs. 7, 8 and 9 are diagrammatic views illustrating the positions of the stocks during the splicing and shearing operations.

Figure 1:
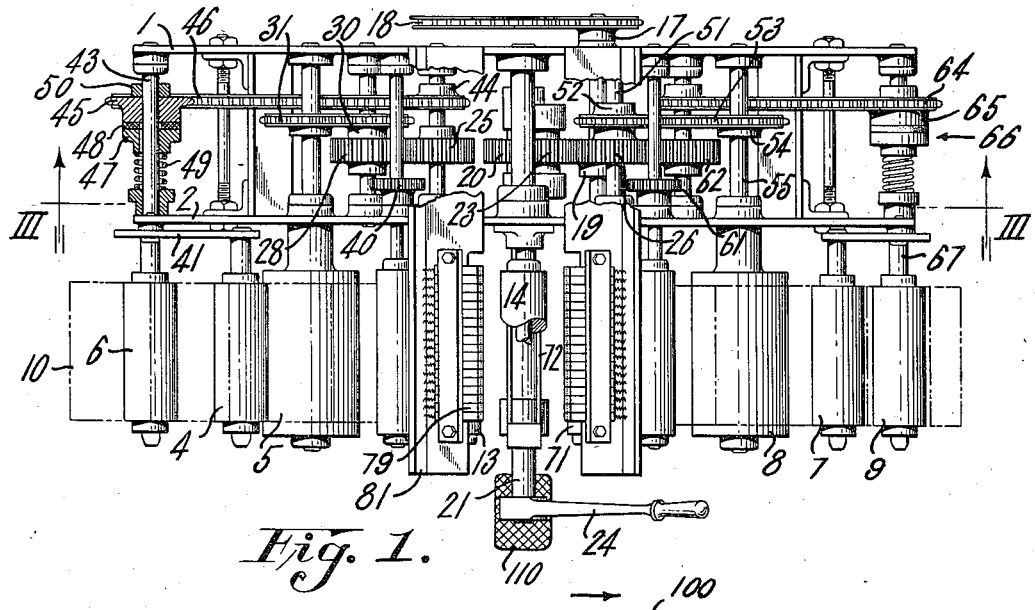
Fig. 1 is a plan view of the complete apparatus.
Figure 2:
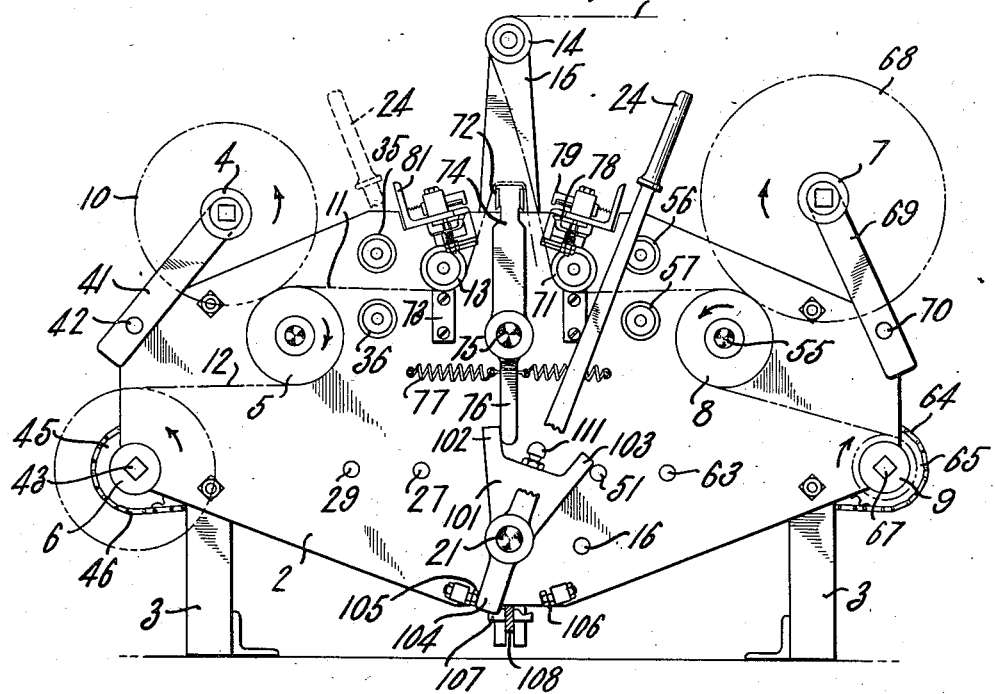
Fig. 2 is a side elevational view thereof.

Referring to the drawings, and in particular to Fig. 1, the frame of the device herein described comprises panels 1 and 2 supported by structural legs 3. The apparatus is divided principally into a stock supplying means and a stock stitching and shearing means. The supplying mechanism, as shown in Fig. 2, consists principally of a stock roll 4, driving roll 5, and liner wind-up roll 6. The mechanism also contains a second similar stock supplying means consisting of a stock roll 7, driving roll 8, and liner wind-up roll 9. The object of this double set of rolls is to enable an operator to replenish the stock on one set of rolls, and to rethread same in operable position while the other set of rolls is in process of operation. For purposes of convenience, I will hereinafter refer to the different sets of rolls as right and left hand stock supplying means.

On the left hand unit, as shown in Fig. 2, a roll of stock 10 is placed on the stock roll 4. The roll of stock 10 consists of a strip of gum stock 11 interwound between convolutions of a liner 12. Stock roll 10 is driven by the drive roll 5, causing the gum stock 11 to be unwound and separated from the liner 12. The gum stock 11 passes around an idler roll 13, after which it is positioned for the splicing operations; or, if the left hand unit is in process of actuation, the stock 11 may pass upward and around idler roll 14 supported from the frame panel 2 by a bracket 15.

After the gum stock leaves the roller 14 it passes to any conventional type of machine which may utilize gum stock in a continuous feeding operation, as in the manufacture of tire components. The liner 12 being separated from the gum stock 11 passes around the drive roll 5, and is wound up onto the liner roll 6.

Figure 3:
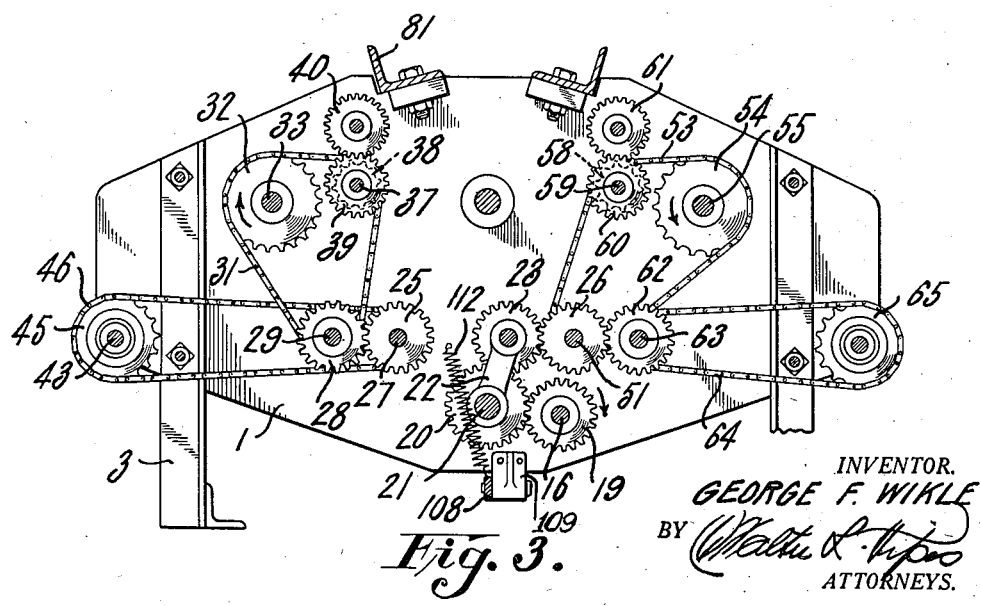
Fig. 3 is an elevational view, in section, taken along lines III—III of Fig. 1.

The mechanism for driving the rolls as above referred to is particularly shown in Fig. 3. The drive shaft 16 rotates continuously during the operation of the apparatus, and preferably receives its power from such further machine as utilizes the gum stock in continuous, unbroken lengths. A sprocket 17, attached to the drive shaft 16, and a chain 18 associated therewith forms means through which power is supplied to the drive shaft 16. A gear 19 keyed to the shaft 16 meshes with gear 20 on operating shaft 21. A link 22 keyed to the shaft 21 operates to retain an idle gear 23 in continual meshing engagement with the gear 20. The shaft 21 extends outwardly from the frame panel 2 and joins with a hand lever 24 so that, upon actuation thereof, the gear 23 is operable in an arcuate movement for engagement or disengagement with gears 25 or 26. This combination operates in effect as a clutch to cause actuation of the right or left hand stock supplying rolls. Fig. 3 shows gear 23 in meshing engagement with gear 26, thus operating the right hand set of feed rolls.

When the left hand set of feed rolls is set into operation, the gear 23 engages with gear 25 on shaft 27. This gear 25 also meshes with a second gear 28 on shaft 29, which in turn contains a sprocket 30 associating with a chain 31 for operating the drive roll 5. This is accomplished by a sprocket 32 attached to the drive roll shaft 33.

The chain 31, in addition to actuating the drive roll 5 also operates a pair of stripping rolls 35 and 36 (Fig. 2). Stripping roll 36 is positioned on a shaft 37 on which is carried a sprocket 38 for intermeshing with the chain 31. The shaft 37 further carries a gear 39 which intermeshes with a gear 40 for driving the upper stripping roll 35.

The purpose of the stripping rolls 35 and 36 is to assist the gum stock in its removal from the liner. The reason for this is that the gum stock, having adhesive qualities, will frequently adhere to the liner and sometimes will tend to follow it, unless independent means are utilized to assist the removal of the gum stock from its adhesion with the liner.

A stock roll 4 (Fig. 2) carrying the roll of stock 10 is supported from an arm 41 pivotally attached to the frame panel 2 at 42. The arm 41 is positioned so that the roll of stock 10 will by its own weight bear against the drive roll 5. The liner roll 6 positioned on shaft 43 is driven from the shaft 27 by means of a sprocket 44 attached to shaft 27, sprocket 45 attached to shaft 43, and a chain 46.

Because of the uniform movement of the stock 11 and the differential speed required of the roller 6 due to the increased building up of the size of the liner roll, together with the desirability of winding the liner in such manner as to wind the stock in compact convolutions, I provide a clutch arrangement which permits slippage, thereby overcoming the differential movement between lineal speeds and revolutions. This I show in Fig. 1, wherein the sprocket 45 is permitted to rotate loosely upon the shaft 43. Transmission of the movement is carried from the sprocket 45 to the shaft 43 by means of a clutch flange 47 keyed to the shaft 43 and associating with the side of the sprocket 45 through a clutch facing 48. A spring 49 circumscribing the shaft 43 exerts the proper pressure between the clutch 47 and the sprocket 45 for supplying the correct driving force between the sprocket 45 and the shaft 43. A collar 50 keyed to the shaft 43 retains the sprocket 45 in correct relative position.

The supply rolls of the right hand unit are driven in a somewhat similar manner. Gear 23 (Fig. 3) engageable with gear 26 drives a shaft 51 which carries a sprocket 52 and is associated with a chain 53. Chain 53 in turn rotates drive roll 8 through a sprocket 54 and shaft 55, and also rotates stripping rolls 56 and 57 by engagement with a sprocket 58 attached to shaft 59 which carries a gear 60 meshing with gear 61. The right hand liner wind-up roll 9 is driven from the sprocket 26 through the gear 62, shaft 63, and chain 64. As explained in connection with the clutch arrangement on the left hand unit, a similar mechanism utilizing sprocket 65, clutch 66 (Fig. 1) and shaft 67 is used on the right hand mechanism.

The liner roll 7 (Fig. 2) containing a supply of stock 68 is supported by an arm 69 pivoted to the frame panel 2 at 70.

It should be understood that, of the right hand and left hand supply units, only one unit operates at a time to supply the rubber strip material for the purpose desired.

In Fig. 2, the strip material is shown being unreeled from the right hand unit, passing around a roller 71 and up over the roller 14. This brings the stock between a shearing and splicing mechanism. During such time as the stock in the right hand unit is being unreeled, a full roll of stock is placed on the left hand unit, threaded around the roller 13, extends upward, and is draped around knife blades 72. Rollers 13 and 71 are supported from brackets 73 attached to the frame panel 2.

The knife blades 72 are supported from arms 74 pivoted at 75. An extension member 76 forms a continuation of the arms 74 beyond the pivot 75. Springs 77 connect the extension member 76 with the frame panel 2 so as to retain the knife blade arms normally in a vertical position.

Figure 4:
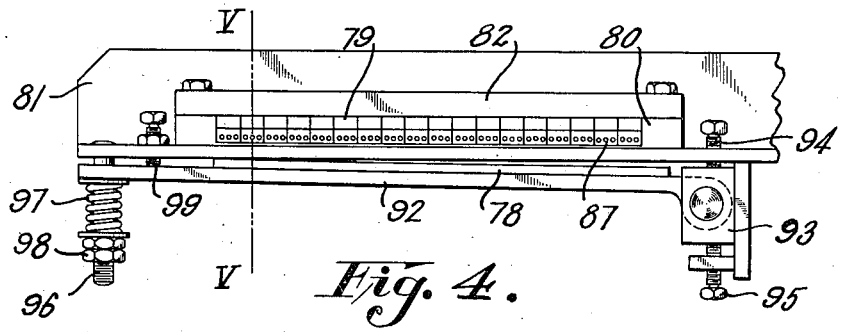
Fig. 4 is an enlarged detailed view of the stitching and shearing mechanism.
Figures 5, 6:
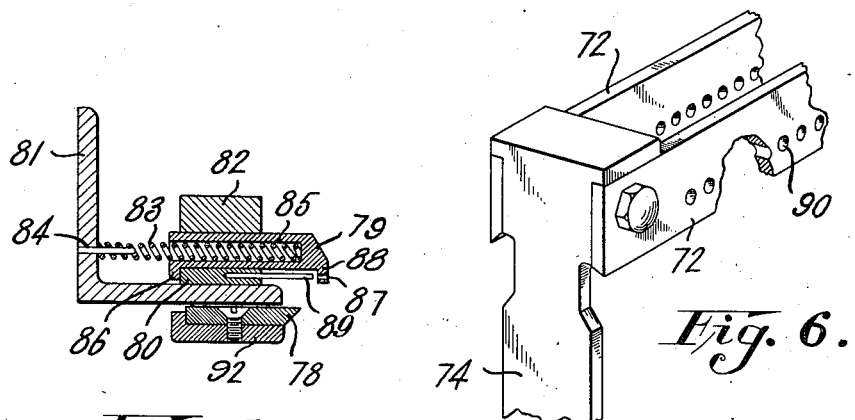
Fig. 5 is a cross sectional view thereof, taken along lines V—V of Fig. 4.
Fig. 6 is a perspective view of a portion of a knife blade unit for shearing gum stocks.

The knife blades 72, carried by the arms 74, are operable by means hereinafter described, for cooperative engagement with a shearing blade 78 and stitching blocks 79 shown in particular in Figs. 4 and 5.

The stitching blocks 79 are slidably supported in a guide bar 80 attached to a structural bracket 81 extending from and fastened to the frame panels 1 and 2. A cover plate 82 encloses the stitching blocks 79 within the guide bar 80. A plurality of these stitching blocks 79 extend transversely of the path of travel of the rubber stock, each being normally retained in an outward position relative to the guide bar 80 by means of a spring 83. The spring 83 is retained in position relative to the structural bracket 81 by means of a pin 84 attached to the structural bracket 81. A counterbore 85 in each stitching block 79 forms an enclosure for the greater part of the spring 83 and permits a longer spring to be used, so that each stitching block is easily slidable within the guide bar 80. A lug 86 extending downwardly from each stitching block 79 on the inner side of the guide bar 80 limits the outward movement of these blocks 79.

The purpose of the plurality of stitching blocks is to enable each block to operate independently so as to apply a uniform and equalized pressure over the width of the rubber stock during the time of the splicing operation.

It sometimes occurs that the stock to be spliced is not sufficiently adhesive to unite by the mere application of a flat pressure. In order to insure the proper splice, regardless of the condition of the stock, I provide additional means by way of localized joints in the nature of a series of perforations. This is accomplished by a series of apertures 87 (Figs. 4 and 5) in the stock contacting portion 88 of the stitching block 79. These apertures 87 cooperate with pins 89 projecting from the guide bar 80 in such manner so that, when the stitching blocks 79 are depressed during the stitching operation, the pins 89 will enter the apertures 87, pass therethrough and extend outwardly from the stitching blocks 79. The side surface of the knife blade 72 which cooperates with the stitching blocks 79 for exerting pressure on the stock to be spliced also has apertures 90 which, when in operative position, are in complementary alignment with the pins 89.

When the mechanism is in splicing position, the pins 89 pass through the apertures 87 of the stitching blocks 79 and into the apertures 90 (Fig. 6) of the knife blades 72. The result is that the pins 89 pierce the rubber stock at a plurality of points along its width. This piercing operation causes interior tacky portions of the stock to come together at localized points, thus insuring a proper adhesion between the stocks to be spliced.

After the stock is properly stitched, the stitching device cooperates with a shearing device to cut away the excess stock adjacent to the splice. The shearing device consists of the knife blade 72 positioned in complementary relation with the shear blade 78 (Figs. 5 and 6). The shear blade 78 is attached to an adjustable support 92 connected to the structural bracket 81 through an adjustable hinge block 93. This block 93 is vertically adjustable by means of adjusting screws 94 and 95, so that the shear blade 78 will properly cooperate with the knife blade 72.

Opposite the hinge end of the support 92 (Fig. 4), the support rides on a stud 96 attached to the structural bracket 81. A spring 97, circumscribing the stud 96 and held by retaining nuts 98, normally holds the support 92 in an upward position against an adjustable stop 99. The blade 78 thus adjustably pivoted and under spring tension provides a means of cooperation with the knife blade 72 for dependably shearing off the surplus of the rubber stock after it is properly spliced.

It is to be understood that there is a right hand and left hand unit as thus described, and that the knife arms 74 support knife blades 72 for cooperation with either the right or left hand shearing and splicing units.

When it is desired to splice and shear the stocks, an operator merely moves the hand lever 24 from the position as shown in Fig. 2 to the position indicated by the dotted lines. It is preferable that the movement of this hand lever be made quickly, for the travel of the stock as withdrawn from the apparatus herein is not stopped during the splicing and shearing operation.

Although the stock will be held momentarily during the stitching operation, this interval is so short that the continuous feeding of stock from the machine herein described is not caused to stop, for the reason that the slight time in which the stock is held by the stitching device is taken up by an inappreciable amount of stretch in the stock itself. If desirable, a small capacity conventional take-up device (not shown) may be used in connection with the present machine so as to obviate entirely any stretching of the stock.

The hand lever 24 connects to the shaft 21 and carries an arm 101 having projections 102 and 103. An extension 104 of the arm 101 operates to contact with adjustable stops 105 and 106 and also to engage with a foot operated latch 107 for retaining the shaft 21 in locked position during operation of the device. The latch 107 is attached to an arm 108 pivoted to brackets 109 extending from the frame panel 2. Associating with the arm 108 is a foot pedal 110 for manually releasing the latch 107 from engagement with the extension 104. A spring 112 (Fig. 3) normally retains the latch 107 in engaging position with the extension 104.

A cam trip pin 111 is positioned on the arm 101 between the projections 102 and 103, and has for its purpose to engage with the extension 76 of the knife blade arm 74.

When it is desired to produce a splicing operation, the operator depresses a foot pedal 110, thereby releasing the latch 107, and moves the hand lever 24 from the position as shown in Fig. 2 to the position indicated by the dotted lines. This movement causes the cam trip pin to engage with the extension 76, thus pressing the knife blades 72 against the stitching blocks 79 and shearing blade 78. The moment that the stitching and shearing operation is complete, the cam trip pin 111 passes under the extension 76, thus leaving the knife blade arm 74 free to seek its normal vertical position by reason of the springs 77. In order that the knife blade arm 74, after it is released from the cam trip pin 111, will not reciprocally swing on its pivot 75, I provide the projections 102 and 103 which operate to stop any momentum of the knife arm 74 after the stitching and shearing operation is complete.

In addition to the stitching and shearing operation, the hand lever 24, through movement of the shaft 21, also operates to move the gear 23 (Fig. 3) back or forth into meshing engagement with either the gear 25 or the gear 26, thus operating as a clutch to start or stop the right or left hand mechanism for unreeling the stock strip material.

With reference to Figs. 7, 8 and 9, I show diagrammatic views illustrating positions of the stock during various stages of the splicing and shearing operation. In Fig. 7, I show the stock 11 from the left hand supply unit passing around the roller 13 and over roller 14. This brings the stock between the arm 74, carrying the knife blades 72 and the left hand stitching blocks 79, and shearing blade 78. In this view, I also show stock 100 of like material as stock 11 passing around the roller 71 and draped around the knife blades 72.

When the stock 11 is about to become exhausted from its source in the left hand supply unit, the operator causes the foot pedal 110 to be operated, and the hand lever 24 actuated. This operation, as shown in Fig. 8, moves the knife arm 74 in the direction of the left hand unit so that the blade 72 pinches the two stocks 11 and 100 together against the stitching blocks 79. Further, this movement causes the stitching blocks 79 to slide in their mountings and to cause the pins 89 (Fig. 5) to perform their punch-like stitching operation, while at the same time the knife blade 72 engages with the shear blade 78, thus severing or trimming the short lengths of stock adjacent to the splice. Immediately the knife blade arm 74 assumes its vertical position and, as shown in Fig. 9, the stock 11 is spliced with the stock 100, carrying same forward in an unbroken continuity.

While the stock 100 is being unreeled from the right hand unit, a full supply of stock is placed in the left hand unit, and its end is draped around the knife blades. This is shown in Fig. 9 by the dotted lines representing the stock 11. In the next operation the operator causes the knife blade arm 74 to be actuated toward the right hand stitching block 79 and shear blade 78 in a similar cycle of operation, thereby joining the stock 100 with the stock 11 so that stock 11 is pulled along according to movement of the stock 100.

Thus I have provided means for supplying strip material in an uninterrupted flow and in a continuous length, by joining successive relatively shorter strips of material from a source constituting a plurality of stock rolls, in the manner as hereinbefore described.

It is to be understood that the invention may be otherwise embodied within the spirit thereof and the scope of the following claims.

Having thus described my invention, what I claim and desire to protect by Letters Patent is:

1. In a splicing machine, a pair of relatively movable pressure members for joining strips of tacky material, and a cutter normally shielded by one of the members and against which the joined strips are pressed for trimming them upon joint movement of said members.

2. In a splicing machine, a pair of relatively movable pressure members for joining strips of tacky material, a resilient mounting for one of said members, and a cutter against which the joined strips are pressed for trimming them during yielding movement of said resilient mounting.

3. In a splicing machine, a yieldable pressure member, a movable pressure member, a cutter on said movable member, and a cutter disposed adjacent to said yieldable pressure member and in cooperative relation to the first named cutter whereby strips of material clamped between said pressure members are severed during retreating movement of said yieldable pressure member.

4. A splicing machine comprising a plurality of spaced relatively fixed pressure members, a movable pressure member for cooperating with said spaced pressure members for joining strips of stock, a yieldable mounting for at least one of each pair of cooperating pressure members during engagement, and a cutter for trimming the joined stock brought into operation by the yielding of said mounting.

5. A splicing machine comprising a plurality of spaced relatively fixed pressure members, an oscillating pressure member for cooperating with said spaced pressure members for joining strips of stock, a yieldable mounting for at least one of each pair of cooperating pressure members during engagement, and a cutter for trimming the joined stock brought into operation by the yielding of said mounting.

6. A splicing machine comprising a plurality of sources of stock, means for delivering a continuous strip of stock, and means for selectively splicing stock ends from said sources to the strip, said means comprising a pressure member associated with each stock source and a common relatively movable pressure member selectively bearing against said first named pressure members.

7. A splicing machine comprising a plurality of sources of stock, means for delivering a continuous strip of stock, and means for selectively splicing stock ends from said sources to the strip, said means comprising a pressure and cutter member associated with each stock source and a relatively movable pressure member.

8. A splicing machine comprising a plurality of sources of stock, means for delivering a continuous strip of stock, and means for selectively splicing stock ends from said sources to the strip, said means comprising a resilient pressure member associated with each stock source and a relatively movable pressure member.

9. A splicing machine comprising a plurality of sources of stock, means for delivering a continuous strip of stock, means for selectively splicing stock ends from said sources to the strip, said means comprising a pressure member associated with each stock source and a relatively movable pressure member, and means for actuating at least one of the pressure members to clamp stock between it and another pressure member.

10. A splicing machine comprising a plurality of sources of stock, means for delivering a continuous strip of stock, means for selectively splicing stock ends from said sources to the strip, said means comprising a resilient pressure member associated with each stock source and a relatively movable pressure member, and cutting means made operative by the retreat of said resilient pressure member.

11. A splicing machine comprising a plurality of sources of stock, means for delivering a continuous strip of stock, means for selectively splicing stock ends from said sources to the strip, said means comprising a pressure member associated with each stock source and a relatively movable pressure member, and locking means for said relatively movable pressure member.

12. A pressing and splicing device comprising a perforated presser member, a resilient mounting for said member, stationary pins aligned with said perforations for extending therethrough upon yielding of said member, and a cutting blade disposed in cooperative relation to said pins and brought into operation during the yielding movement of said member.

GEORGE F. WIKLE.